US006397183B1

(12) United States Patent
Baba et al.

(10) Patent No.: US 6,397,183 B1
(45) Date of Patent: May 28, 2002

(54) DOCUMENT READING SYSTEM, READ CONTROL METHOD, AND RECORDING MEDIUM

(75) Inventors: Hitomi Baba, Kawasaki; Takahiro Fukushima, Inagi; Makiko Nakao, Inagi; Momoko Kanada, Inagi, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/709,458

(22) Filed: Nov. 13, 2000

Related U.S. Application Data

(63) Continuation of application No. PCT/JP99/01760, filed on Apr. 2, 1999, now abandoned.

(30) Foreign Application Priority Data

May 15, 1998 (JP) .......................................... 10-134085

(51) Int. Cl.[7] ......................... G01L 13/08; G01L 13/04; G01L 21/06

(52) U.S. Cl. ........................ 704/260; 704/258; 704/271

(58) Field of Search ................................ 704/260, 270, 704/258, 271

(56) References Cited

U.S. PATENT DOCUMENTS 5,500,919 A * 3/1996 Luther ........................ 704/260
5,850,629 A * 12/1998 Holm et al. ................ 704/260

(List continued on next page.)

FOREIGN PATENT DOCUMENTS

EP 0 848 373 A2 12/1997
JP A 01204100 A 5/1989 ............. G10L/5/00

(List continued on next page.)

OTHER PUBLICATIONS

TextAssist® ("User's Guide," Creative Labs ©Feb., 1994).*

Cover ("The XML Cover Pages," OASIS © 1994).*

"Emacspeak—Speech Interface," Raman, T.V., Common Ground, Chi '96 Conference Proceedings, Conference on Human Factors in Computing Systems, Vancouver, British Columbia, Apr. 13–18, 1996, pp. 66–71, XP 000657803.

"V–Lynx: Bringing the World Wide Web to Sigh Impaired Users," Krell Michael et al., Assets '96, British Columbia, Apr. 11–12, 1996, vol. Conference 2, pp. 23–26, XP000683135.

Communication from the European Patent Office (3 pages) dated Sep. 17, 2001, including Supplemental European Search Report dated Sep. 10, 2001.

*Primary Examiner*—Richemond Dorvil
*Assistant Examiner*—Daniel A. Nolan
(74) *Attorney, Agent, or Firm*—Staas & Halsey LLP

(57) ABSTRACT

The present invention has an architecture capable of eliminating a necessity for previously designating in a document, when reading aloud the document, attributes for reading aloud. Focusing on utilizing the document with attributes, a document reading system analyzes contents of the attributes and reads aloud texts in the document with a voice synthesizing module. The attributes are set irrespective of reading aloud conditions. A basic reading condition setting module sets the reading aloud conditions for the entire document. An individual reading condition setting module sets the reading aloud condition for every attribute. A selective reading module, when reading aloud the document, in principle, reads aloud the text with reference to the basic reading aloud condition set by the basic reading condition setting module, and selectively reads aloud the text having the individual reading aloud condition given a higher priority than the basic reading aloud condition.

10 Claims, 10 Drawing Sheets

U.S. PATENT DOCUMENTS

| | | | | | |
|---|---|---|---|---|---|
| 5,924,068 | A | * | 7/1999 | Richard et al. | 704/260 |
| 6,006,187 | A | * | 12/1999 | Tanenblatt | 704/260 |
| 6,216,104 | B1 | * | 4/2001 | Moshfeghi et al. | 704/270 |

FOREIGN PATENT DOCUMENTS

| | | | | |
|---|---|---|---|---|
| JP | 01-204100 | * | 8/1989 | G01L/5/00 |
| JP | 02-289071 | * | 11/1990 | G01L/3/00 |
| JP | A 02289071 A | | 11/1990 | G06F/15/20 |
| JP | 06-337876 | * | 12/1994 | G01L/3/00 |
| JP | A 06337876 A | | 12/1994 | G06F/15/20 |
| JP | A 08272388 A | | 10/1996 | G10L/3/100 |
| JP | A 09244869 A | | 9/1997 | G06F/3/16 |

* cited by examiner

FIG. 2

| TAG CATEGORY | VOICE LOUDNESS (1–5) | VOICE PITCH (1–5) | VOICE TYPE | VOICE INTONATION (1–5) |
| --- | --- | --- | --- | --- |
| BASIC SETTING | 3 | 3 | MALE VOICE | 4 |
| TAG 1 | 3 | 4 | FEMALE VOICE | 3 |
| TAG 2 | 4 | 4 | MALE VOICE | 3 |
| TAG 3 | 5 | 4 | MALE VOICE | 4 |
| ~ | | | | |
| TAG 4 | 2 | 3 | MALE VOICE | 5 |

FIG. 3

| TAG CATEGORY | VOICE LOUDNESS (1-5) | VOICE PITCH (1-5) | VOICE TYPE | VOICE INTONATION (1-5) |
|---|---|---|---|---|
| BASIC SETTING | 3 | 3 | MALE VOICE | 4 |
| TAG 1 | BASIC LOUDNESS | HIGHER THAN BASIC LOUDNESS | FEMALE VOICE | LOWER THAN BASIC INTONATION |
| TAG 2 | LARGER THAN BASIC LOUDNESS | HIGHER THAN BASIC PITCH | BASIC VOICE | LOWER THAN BASIC INTONATION |
| TAG 3 | LARGER THAN BASIC LOUDNESS | HIGHER THAN BASIC PITCH | BASIC VOICE | BASIC INTONATION |
| ~ | | | | |
| TAG 4 | LOWER THAN BASIC LOUDNESS | BASIC PITCH | BASIC VOICE | LARGER THAN BASIC INTONATION |

※ ATTRIBUTES OF TAGS ARE RELATIVELY SHOWN BASED ON BASIC SET VALUES

FIG. 8

```
                                                                                  LINE
<html>                                                                            1
<head><title> SAMPLE HOMEPAGE </title></head>                                     2
<body bgcolor="#ffffff" text="#ff0080" link="#d9006c" vlink="#ff2693" link="#ff55aa">   3
<br> THIS PAGE CONTAINS VARIOUS ITEMS OF INFORMATION. <br>                        4
PLEASE ENJOY READING. <br>                                                        5
<comment> FOLLOWING INFORMATION IS CREATED WITH COOPERATION OF
XXX-SAN </comment>                                                                6
<br><center><font size=2>(UPDATED ON JANUARY 1, 1998) </font></center><br>        7
<font size=5> LET US AT FIRST SHOW HOW DELICIOUS SALAD IS
COOKED.</font><br><br>                                                            8
FIRST, GET FRESH RAW MATERIALS. <br>                                              9
FOR GETTING THEM, <a href="information.html"> PLEASE LOOK ON PAGE
</a> FOR HOME DELIVERY OF FRESH VEGETABLES. <br>                                  10
HAVING GOT VEGETABLES, NEXT WASH THEM. <br>                                       11
</body>                                                                           12
</html>                                                                           13
```

FIG. 9

| HTML TAGS | READING ON/OFF | VOICE TYPE | VOICE LOUDNESS | VOICE PITCH |
|---|---|---|---|---|
| COMMENT <comment> | OFF | – | – | – |
| LINK <a href> | ON | FEMALE VOICE | 3 | 3 |
| MAIL <a href=mailto:> | ON | FEMALE VOICE | 3 | 3 |
| TITLE <title> | OFF | – | – | – |
| HEADING <hn> (n=1, 2, 3···) | ON | MALE VOICE | 5 | 4 |
| FONT SIZE <fontsize=n> (n=1, 2) | ON | MALE VOICE | 2 | 3 |
| FONT SIZE <fontsize=n> (n=5, 6, 7) | ON | MALE VOICE | 5 | 4 |
| OTHER TAGS | ON | MALE VOICE | 3 | 3 |

FOLLOWING IS SETTING RANGE OF PARAMETERS IN VOICE SYNTHESIZATION

READING ON/OFF ON/OFF

VOICE TYPE MALE VOICE/ FEMALE VOICE

VOICE LOUDNESS 1~5

VOICE PITCH 1~5

FIG. 10

THIS PAGE CONTAINS VARIOUS ITEMS OF INFORMATION.

PLEASE ENJOY READING.

UPDATED ON JANUARY 1, 1998

LET US AT FIRST SHOW HOW DELICIOUS SALAD IS COOKED.

FIRST, GET FRESH RAW MATERIALS.

FOR GETTING THEM, PLEASE LOOK ON PAGE FOR HOME DELIVERY OF FRESH VEGETABLES.
HAVING GOT VEGETABLES, NEXT WASH THEM.

FIG. 11

1 ( MALE VOICE, LOUDNESS = 3、 PITCH = 3)
3 ( MALE VOICE, LOUDNESS = 2、 PITCH = 3)
4 ( MALE VOICE, LOUDNESS = 5、 PITCH = 4)
5 ( MALE VOICE, LOUDNESS = 3、 PITCH = 3)
7 ( FEMALE VOICE, LOUDNESS = 3, PITCH = 3)
8 ( MALE VOICE, LOUDNESS = 3、 PITCH = 3)

NUMERAL ATTACHED TO HEAD OF LINE IS CORRESPONDING TEXT LINE NUMBER

DOCUMENT READING SYSTEM, READ CONTROL METHOD, AND RECORDING MEDIUM

CROSS-REFERENCE TO RELATED APPLICATIONS

This is a continuation of application PCT/JP99/01760, filed on Apr. 2, 1999, now abandoned.

BACKGROUND OF THE INVENTION

1. Field of the Invention

The present invention relates to a document reading system for reading aloud texts in a document inputted to a computer, and to a read control method.

2. Description of the Related Arts

A system disclosed in, e.g., Japanese Patent Application Laying-Open Publication No. 8-272388 is known as a document reading system in the prior art.

This document reading system includes, as a voice synthesizing module for vocally synthesizing text data in kanji characters mixed with kana characters, an embedding module for embedding control data into text data, and an output module for synthesizing and outputting the voices based on the text data with a voice quality corresponding to the control data.

This type of system, however, needs to embed the control data into the text data beforehand in order to read a certain portion with some quality of voice.

Accordingly, if a scheme is that, in the case of reading the HTML texts on the Internet, some proportion of texts are read in a male voice and the rest of those texts are read in a female voice, it is required that the control data be written into the desired portion in the document each time, which is considered laborious.

The present invention, which was devised under such circumstances, aims at providing a technology capable of eliminating a necessity for embedding the control data for giving a reading condition into the document each time.

SUMMARY OF THE INVENTION

According to the present invention, focusing on such a point that an HTML (Hyper Text Mark-up Language) text and an RTF (Rich Text File) text previously contain attribute data (which will hereinafter be called tags as the case may be) for defining a decoration condition, etc. with respect to the text in the document irrespective of reading aloud in voice, the tag is utilized as control data for reading aloud.

A document reading system for analyzing contents of a document with attributes and reading aloud texts in the document by use of a voice synthesizing module, comprises a basic reading condition setting module for, the attributes being set irrespective of reading aloud conditions, setting the reading aloud conditions for the entire document, an individual reading condition setting module for setting the reading aloud condition for every attribute, and a selective reading module for, when reading aloud the document, in principle, reading aloud the text with reference to the basic reading aloud condition set by the basic reading condition setting module, and selectively reading aloud the text having an individual reading aloud condition with a higher priority than the basic reading aloud condition.

Herein, the reading aloud condition is any one of at least a quality (e.g., a voice pitch, a male or female voice), a volume (loudness of voice) and an accent (voice intonations and dialects) of a reading aloud voice, and a selection of whether to read aloud or not. For example, supposing that there is a text such as (<h2> introduction of this homepage </h2>) in the HTML document, tags <h2></h2> specify a size of characters interposed between these tags when displayed. Then, in relation to these tags <h2></h2>, the characters therebetween is read aloud in a male voice.

In particular, it is preferable that the reading aloud condition set for every attribute by the individual reading condition setting module be related to an essential meaning of the attribute, and an essential meaning designated by the attribute can be associated from the reading aloud voice.

To be specific, the tags <h2></h2> indicate the size of the characters, h2 represents a display larger than h3 but smaller than h1. Then, a document specified by h2 is read louder than by h3 but fainter than by h1, whereby the reading aloud can be done in a mode based on the HTML protocol and the document can be visually associated simply by hearing the reading aloud voice.

The document reading system may further comprise a reading condition storage module for storing the reading aloud conditions.

In the document reading system according to the present invention, the basic reading condition setting module sets the reading aloud conditions for the entire document, and subsequently the individual reading condition setting module sets the reading aloud condition for every attribute.

When reading aloud the document, the text with no particular designation is read aloud referring in principle to the basic reading aloud condition set by the basic reading condition setting module.

Various items of data can be known from the tags in the document. In the case of the HTML, the various tags of a title of the page, a heading thereof, content texts, links, mail addresses and so on, are described in the document, and, on a screen, character sizes and colors are selectively set corresponding to the tags. In the prior art reading system, however, all the portions are read aloud in the same voice, with the result that these items of data are lost. According to the present invention, the tag data can be recognized in voice by setting the reading conditions corresponding to the essential data contents of the tags.

Note that the attribute given to the document serves to control how the document is displayed. For example, when the attribute given to the document is tag data, the document is displayed in HTML format.

A document reading method of reading aloud texts in a document by use of a voice synthesizing module according to the present invention, comprises a step of judging an attribute in the document, for controlling display of the document, and a step of changing a condition of reading aloud the text of which the display is controlled by the attribute on the basis of a result of the judgment.

In this document reading method, the reading aloud condition may be changed corresponding to a category of the attribute.

According to the present invention, there is also provided a readable-by-computer recording medium recorded with a program for making a computer, for reading aloud texts in a document by use of a voice synthesizing module, then executing a step of judging an attribute in the document for controlling display of the document, and finally a step of changing a condition of reading aloud the text of which the display is controlled by the attribute on the basis of a result of the judgement.

The readable-by-computer recording medium may be recorded with a program for making the computer further execute a step of changing the reading aloud condition corresponding to a category of the attribute.

BRIEF DESCRIPTION OF THE DRAWINGS

FIG. 2 is a chart showing an example of setting reading aloud conditions (fixed values);

FIG. 3 is a chart showing an example of setting the reading aloud conditions (relative designations to the basic settings);

FIG. 8 is a view showing the reading target in FIG. 7 as source data;

FIG. 9 is a chart showing a recommendation setting pattern of reading aloud conditions;

FIG. 10 is view showing reading target text data; and

FIG. 11 is a view showing reading assist data.

DESCRIPTION OF THE PREFERRED EMBODIMENT

Figure 1:
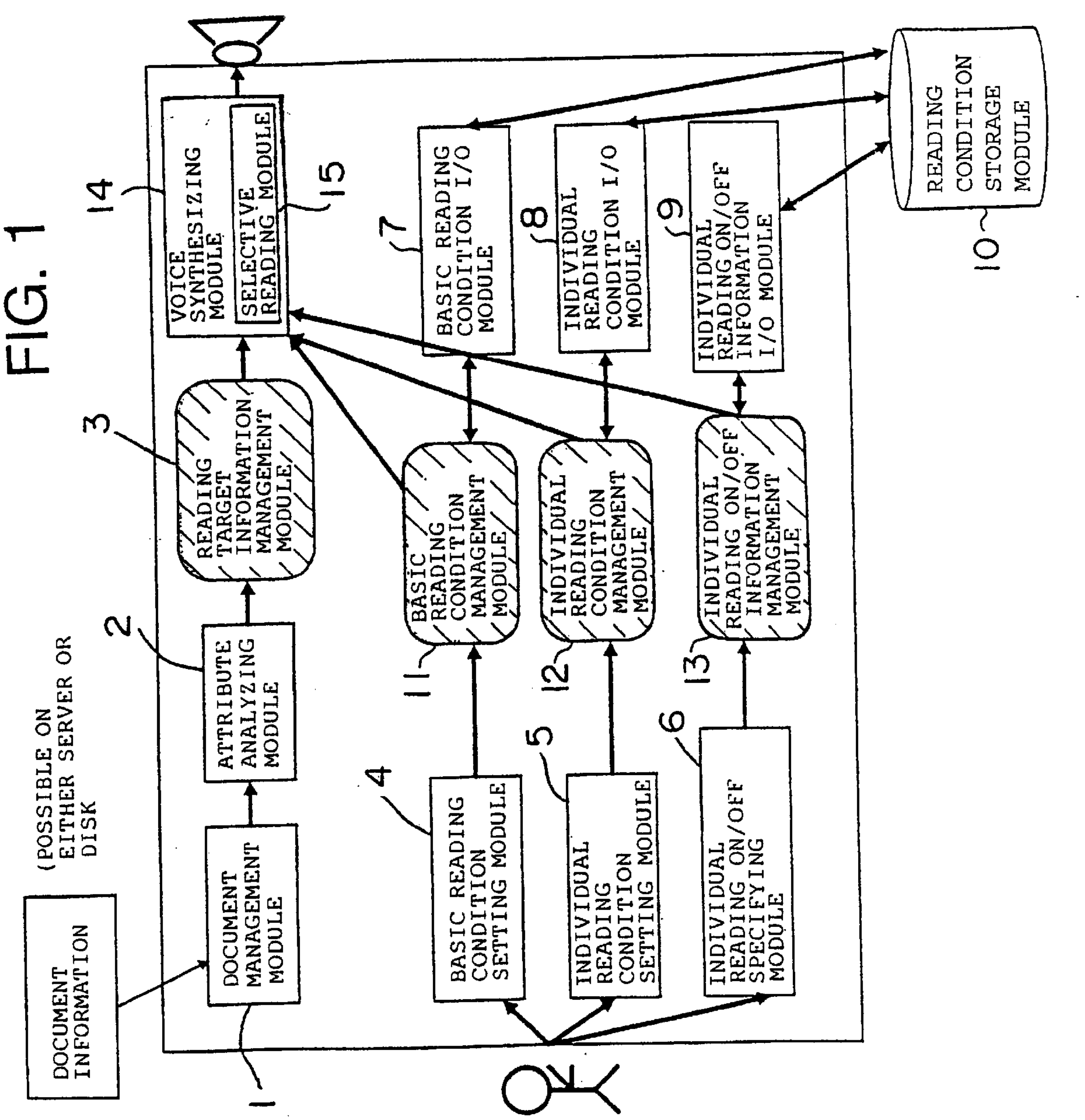
FIG. 1 is a block diagram showing an example of an architecture of the present invention.

FIG. 1 shows an architecture in one embodiment of the present invention.

According to a program-based architecture of the present invention, a CPU of a computer executes this program, thereby actualizing function performing modules on the CPU as shown in FIG. 1.

As illustrated in FIG. 1, the document reading system includes a document management module 1 for managing document information read by the computer through a recording medium such as a floppy disk and a CD-ROM and media like Internet, etc.

This document management module 1 is defined as software for reading and downloading documents such as HTML text, RFT texts, etc.

The document reading system further includes an attribute analyzing module 2 for analyzing the document read by the document management module 1 of the computer and thus detecting a (tag) as an attribute thereof. Then, a reading target information management module 3 manages, as reading target information, the document read by the document management module 1 and the tag analyzed by the attribute analyzing module 2.

On the other hand, the document reading system has a basic reading condition setting module 4 for setting reading aloud conditions for the whole document, an individual reading condition setting module 5 for setting the reading aloud condition per attribute and an individual reading ON/OFF specifying module 6 for setting whether a text document with an attribute specially designated as an individual reading aloud condition, though it is a concept embraced by the individual reading condition setting module 5, should be (read aloud (ON)) or (not: read aloud (OFF)), of which settings are done through an input device such as a keyboard, etc.

The document reading system further includes a basic reading aloud condition management module 11, an individual reading condition management module 12 and an individual reading ON/OFF information management module 13, which manage the respective conditions set by the basic reading condition setting module 4, the individual reading condition setting module 5 and the individual reading ON/OFF specifying module 6, and write or read the respective conditions to or from a hard disk serving as a reading condition storage module 10 through a basic reading condition I/O module 7, an individual reading condition I/O module 8 and an individual reading ON/OFF information I/O module 9.

Then, when reading aloud the document, the basic reading condition management module 11, the individual reading condition management module 12 and the individual reading ON/OFF information management module 13, read the respective conditions from the hard disk serving as the reading condition storage module 10 through the basic reading condition I/O module 7, the individual reading condition I/O module 8 and the individual reading ON/OFF information I/O module 9, and transmit data about those conditions to a voice synthesizing module 14.

The voice synthesizing module 14 includes a selective reading module 15 for reading aloud, with reading targets being set to the document data and the (tag) defined as an attribute which are managed by the reading target information management module 3, at first the text with reference to the basic reading aloud condition set by the basic reading condition setting module 4, and selectively reading aloud the text having an individual reading aloud condition with a higher priority than the basic reading aloud condition.

Note that a voice synthesizing mode used herein upon reading has hitherto been known and is not therefore explained in particular.

Herein, FIG. 2 shows an example where the reading aloud conditions are set in fixed values. Referring to FIG. 2, the reading aloud conditions are voice loudness, a voice pitch, a voice type (male voice and female voice) and a voice intonation.

Then, the basic reading condition setting module 4 sets, as basic conditions, the loudness, the pitch, the type (male voice and female voice) and the intonation of the voice as shown in FIG. 2. Further, the individual reading condition setting module 5 sets the conditions shown in FIG. 2 with respect to tags 1–4.

FIG. 3 is a chart showing a case where the fixed values shown in FIG. 2 are designated relative to the basic settings. Herein, FIG. 3 is a representation shown relative to the basic set values as standard values.

Figure 4:
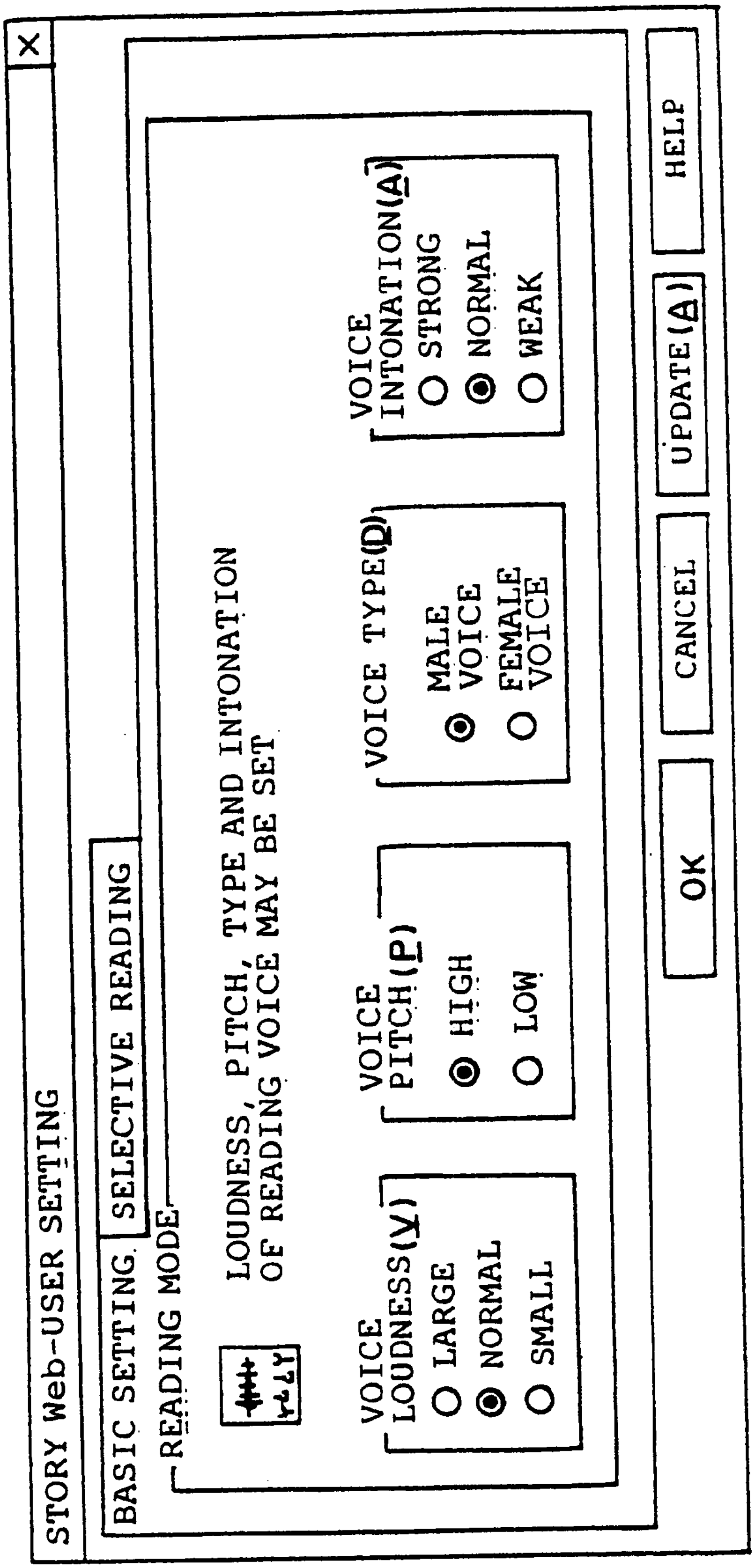
FIG. 4 is a view showing one example of a basic reading condition setting module.
Figure 5:
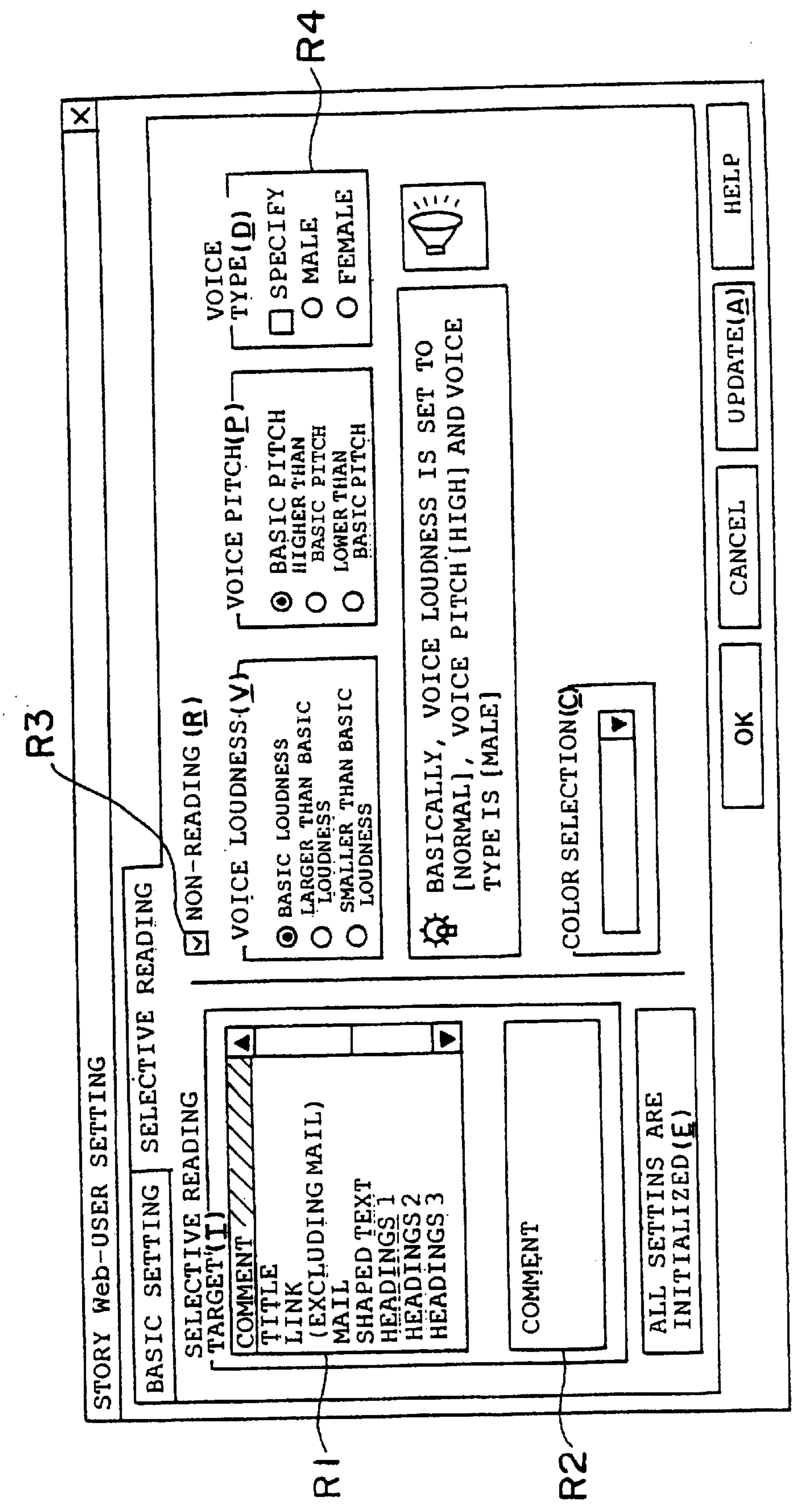
FIG. 5 is a view showing an individual reading condition setting module and an individual reading ON/OFF specifying module.

The settings by the basic reading condition setting module 4, the individual reading condition setting module 5 and the individual reading ON/OFF specifying module 6 are inputted specifically on an input screen as shown in FIGS. 4 and 5.

FIG. 4 shows an example of the setting by the basic reading condition setting module 4. FIG. 5 shows the settings by the individual reading condition setting module 5 and the individual reading ON/OFF specifying module 6. Herein, names of tags of the HTML documents are indicated in a selective reading target box R1, and the name of the actual tag of the name indicated in the box R1 is shown in a box R2 under the box R1. On the right side of the boxes R1 and R2, a check box R3 for designating the read is provided as the individual reading ON/OFF specifying module 6 for setting whether to individually read with respect to the reading target tag. An individual setting check box R4 for setting the voice loudness, the voice pitch and the voice type is provided as the individual reading condition setting module 5 under the check box R3. The individual setting check box R4 is activated when (Reading) is set in the check box R3.

With respect to the settings described above, as shown in FIG. 2, the specific values maybe set as the tag data, and the settings relative to the basic settings may also be taken. In the case shown in FIG. 2, an advantage is that the set value per tag is retained without being influenced by the basic settings. In the case shown in FIG. 3, the representation can be given by the relative designation to the basic settings, and hence it is feasible to make a sensible designation such as (Let's try to read in a louder and higher-pitch voice than in the normal portion), without indicating the specific numerical values. By use of those pieces of information, the attribute analyzing module 2 analyzes the tags with respect to the document data obtained by the document management module 1 in FIG. 1, and transfers a result of the analysis as reading target data to the voice synthesizing module 14.

On the other hand, based on the basic reading voice setting previously designated and the reading voice setting per tag, the voice synthesizing module 14 reads aloud the given reading target data by use of the designated voice attribute.

Figure 6:
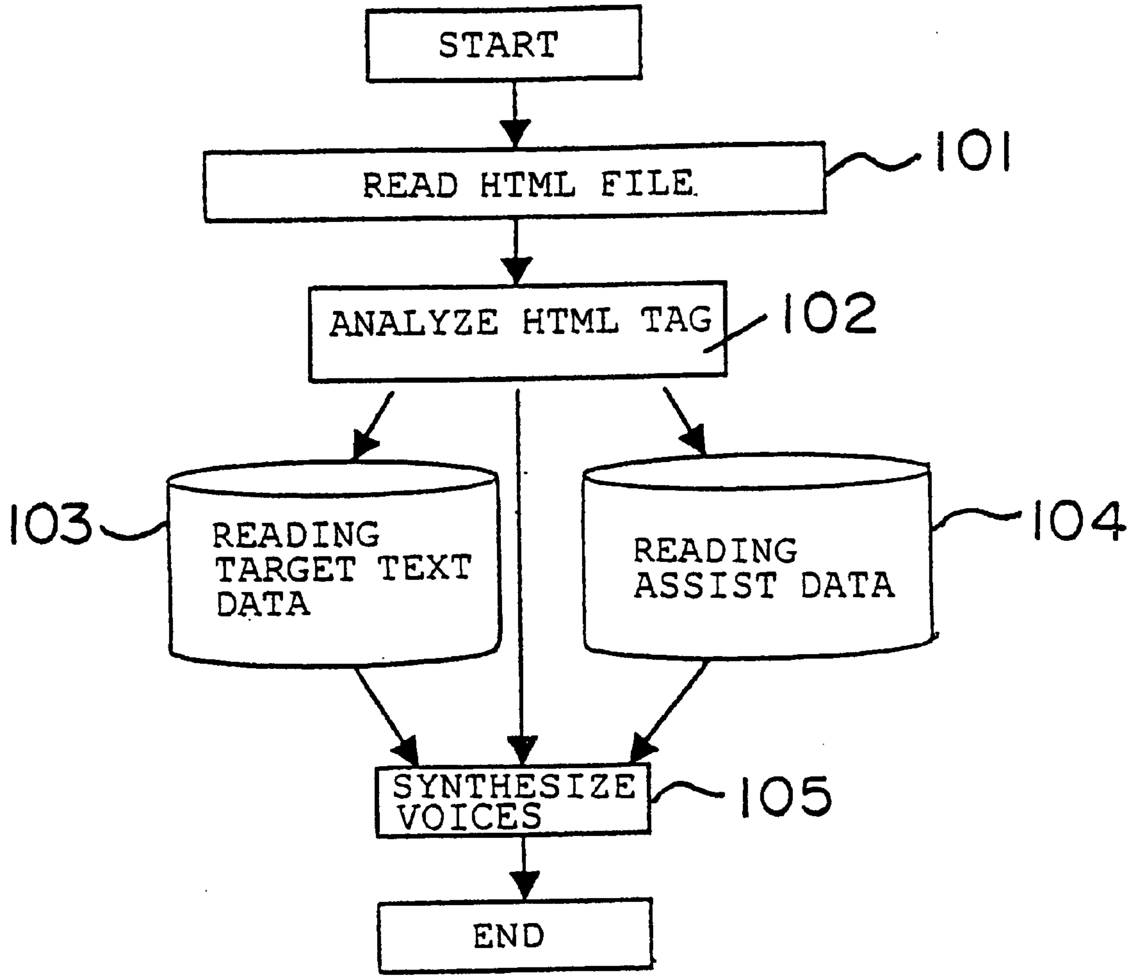
FIG. 6 is a flowchart showing reading steps.

These reading steps can be understood by referring to the flowchart in FIG. 6.

Figure 7:
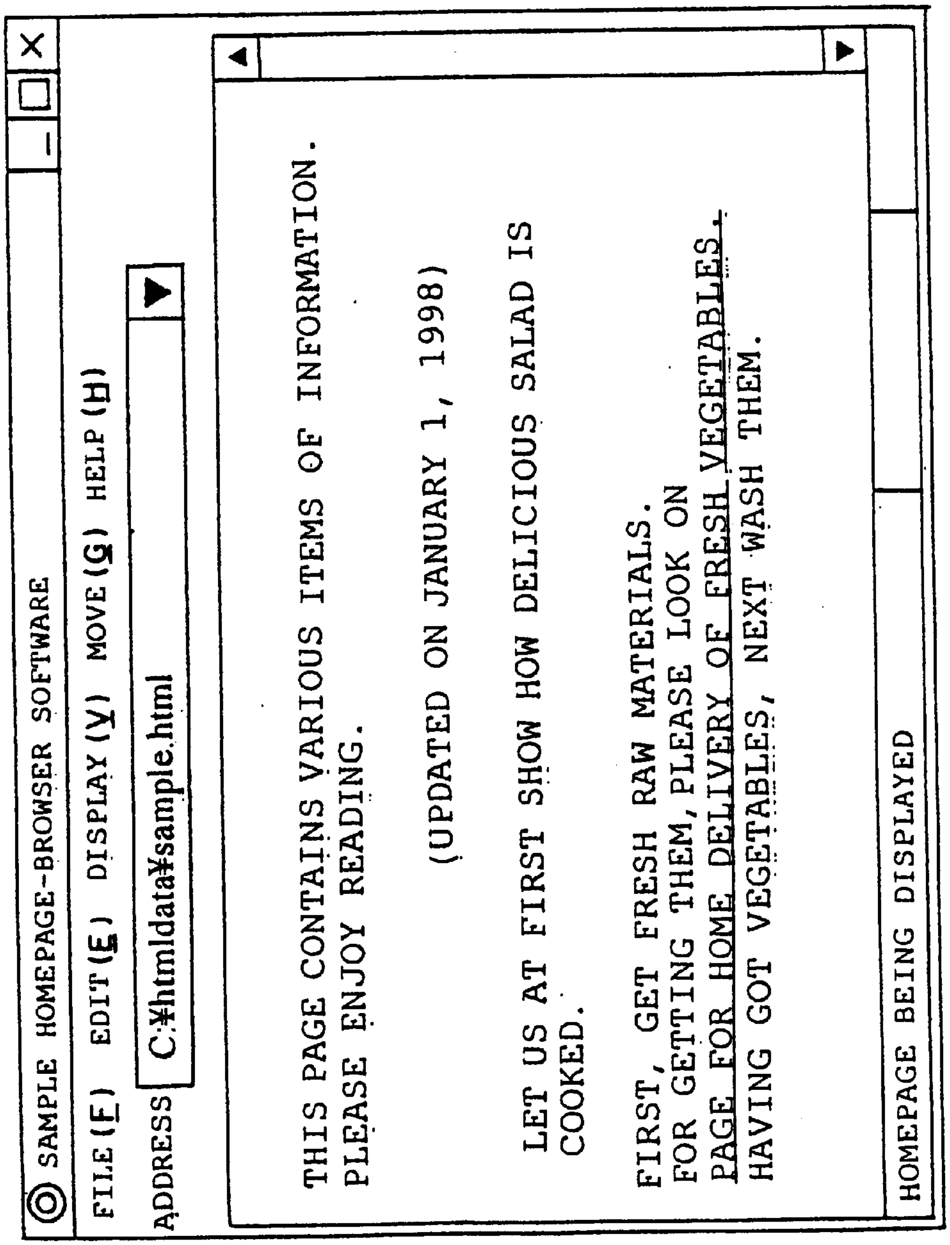
FIG. 7 is a view showing an example of displaying an HTML document by way of one example of a reading target.

An example of reading the HTML document is shown in FIGS. 7 and 8. FIG. 7 shows an example where the HTML document is displayed on a browser. FIG. 8 shows source data thereof. In this example, the reading voice setting per tag of the HTML has already been set, and it is herein assumed that a recommendation pattern shown in FIG. 9 be set. This recommendation pattern is a pattern preset as a standard model in the reading condition storage module 10.

To start with, in step 101, the document management module 1 downloads the source data shown in FIG. 8 and reads the data as an HTML file. Next, the HTML attribute analyzing module 2 executes an analysis on a character-basis from the head of the data of the HTML file. A character or symbol interposed between "<" and ">" in the data is interpreted as a tag. If not categorized as the selective reading target tag, that may be ignored, and, whereas if being the selective reading target tag, the reading target information management module 3 stores the memory with the reading target text shown in FIG. 10 (step 103). Then, the reading target information management module 3 stores the memory with reading assist data shown in FIG. 11 (step 104). Herein, the selective reading assist data are setting data of a position and a voice in the reading target text data.

In the case shown in FIG. 8, the processing is done as follows:

(1) Data (male voice, loudness=3, pitch=3) written in a column (other tags) in a voice setting table (FIG. 9), are registered as a voice initial setting. Reading is carried out in this mode for the first time.

(2) The first line is processed. A tag <html> is out of the reading target and is therefore ignored.

(3) The second line is processed. A tag <head> is out of the reading target and is therefore ignored. A next tag <title> is defined as (reading OFF) in the voice setting table (FIG. 9), and hence the reading is skipped over to a corresponding tag </title>. A next tag </head> is also out of the reading target and is therefore ignored.

(4) The third line is processed. A tag <body> is out of the reading target and is therefore ignored.

(5) The fourth line is processed. A tag <br> is out of the reading target and is therefore ignored. A next sentence is additionally registered as a reading target to (reading target text data).

(6) The fifth line is processed. The sentence is additionally registered as a reading target.

(7) The sixth line is processed. A tag <comment > is set as (reading OFF) in the voice setting table, and therefore the reading is skipped over to a corresponding tag </comment>.

(8) The seventh line is processed. The reading is skipped over two tags <br> and <center>. With a next tag <font size=2>, the voice setting is changed to (male voice, loudness=2, pitch=3), which is stored in (reading assist data). Further, a text delimited by a tag </font> is additionally registered as a reading target.

(9) The eighth line is likewise processed. The voice setting is changed to (male voice, loudness=5, pitch=4) corresponding to <font size=5>, which is stored in (reading assist data). Further, the text delimited by the tag </font> is additionally registered as a reading target.

(10) Next, the voice setting is initialized to (male voice, loudness=3, pitch=3), and a text is also registered.

(11) The processing of a ninth line is that only a text is added. The tag <br> is ignored.

(12) The processing of a tenth line is that a text down to (FOR GETTING THEM,) is registered in the reading target text data. Next, the voice setting is initialized corresponding to <a href>, and a subsequent text is registered.

(13) The processing of an eleventh line is that only a text is added. The tag <br> is ignored.

(14) Twelfth and thirteenth lines are processed so that tags are ignored, and the processing comes to an end.

As a result, the data are stored in (reading target text data) and (reading assist data). The voice synthesizing module interprets those pieces of data and synthesizes the voices.

As discussed above, the selective reading module 15 is capable of selectively reading in an elaborate manner by use of the tags as the elements of the document. For instance, if (reading) is designated to only a heading of HTML, it follows that only the portions considered important are extracted and read aloud in general. Further, it is also feasible to designate in such a mode so that the portion with a larger font is read louder, and the portion with a smaller font is read fainter. Therefore, even a nuance of sentence that can not be conveyed simply by reading with no intonation can be read aloud by the voice synthesizing module without looking at the screen.

<Other Examples>

The attribute analyzing module 2 analyzes the tags in the document, thereby recognizing various pieces of information. In the case of the HTML, the tags of the title of the page, the heading thereof, the content texts, the links, the mail addresses and so on, are described in the document, and, on the screen, the character sizes and colors are selectively set corresponding to the tags.

Then, the reading aloud conditions corresponding to those pieces of data are set corresponding to meanings and contents of the tags. These settings are stored beforehand in a way of corresponding to the tags in an unillustrated table. With this contrivance, the same tag is read aloud always in the same voice, and the reading voice may be set louder or fainter corresponding to the character size with reference to the table each time the tag is analyzed. It is therefore possible to set the reading aloud condition corresponding to the essential data content of the tag and to recognize the tag data in voice.

According to the present invention, the document can be selectively read aloud by utilizing the attribute data as they are, which have been set beforehand in the document, and there is no necessity for setting each piece of attribute data for the selective reading aloud in the document.

Then, if the reading aloud condition set per attribute by the individual reading condition setting module 5 is related to the essential meaning of the attribute, the essential meaning designated by the attribute can be associated from the voice uttered by reading aloud, and the contents of the document that have been read aloud in voice can be visually comprehended.

The present invention is applicable to information processors such as a personal computer, a word processor and so on that are capable of dealing with the text data, and to an internet terminal capable of dealing with the HTML document.

What is claimed is:

1. A document reading system for analyzing contents of a document with attributes and reading aloud texts in the document by use of a voice synthesizing module, comprising:

a basic reading condition setting module for setting the basic reading aloud conditions for the entire document, the attributes being set irrespective of the reading aloud conditions;

an individual reading condition setting module for setting the individual reading aloud condition for every attribute, and a selective reading module for reading aloud the text with reference to the basic reading aloud condition set by said basic reading condition setting module, and for selectively reading aloud the text having an individual reading aloud condition with a higher priority than the basic reading aloud condition.

2. A document reading system according to claim 1, wherein the reading aloud condition is any one of at least a quality, a volume and an accent of a reading voice, and a selection of whether to read or not.

3. A document reading system according to claim 1, wherein the reading aloud condition set for every attribute by said individual reading condition setting module is related to an essential meaning of the attribute, and an essential meaning designated by the attribute can be associated from the reading aloud voice.

4. A document reading system according to claim 1, further comprising a reading condition storage module for storing the reading aloud conditions.

5. A document reading system according to claim 1, wherein the attribute serves to control displaying the document.

6. A document reading system according to claim 1, wherein the document is an HTML document, and the attribute is tag data.

7. A document reading control method of reading aloud texts in a document by use of a voice synthesizing module, comprising:

judging an attribute, in the document, for controlling display of the document; and changing a condition of reading aloud the text of which the display is controlled by the attribute on the basis of a result of the judgement.

8. A document reading control method according to claim 7, wherein the reading aloud condition is changed corresponding to a category of the attribute.

9. A storage medium readable by a computer, tangibly embodying a program of instructions executable by the computer to perform method steps for displaying content data, for reading aloud texts in a document by use of a voice synthesizing module, the method steps comprising:

judging an attribute in the document, for controlling display of the document; and changing a condition of reading aloud the text of which the display is controlled by the attribute on the basis of a result of the judgement.

10. A storage medium readable by a computer, according to claim 9, for making a computer further comprising:

a step of changing the reading aloud condition corresponding to a category of the attribute.

* * * * *

UNITED STATES PATENT AND TRADEMARK OFFICE
CERTIFICATE OF CORRECTION

PATENT NO. : 6,397,183 B1 Page 1 of 1
DATED : May 28, 2002
INVENTOR(S) : Hitomi Baba et al.

It is certified that error appears in the above-identified patent and that said Letters Patent is hereby corrected as shown below:

Title page,
Item [75], Inventors, change Momoko "Kanada" to -- Momoko -- Kanda --
Item [56], References Cited, OTHER PUBLICATIONS, in the 4th reference - before "British Columbia", insert -- Vancouver, --

Signed and Sealed this

Eighth Day of October, 2002

*Attest:*

JAMES E. ROGAN

*Attesting Officer* *Director of the United States Patent and Trademark Office*